(12) United States Patent
Groeblacher et al.

(10) Patent No.: US 12,346,001 B2
(45) Date of Patent: Jul. 1, 2025

(54) QUANTUM WAVELENGTH CONVERTER BETWEEN A MICROWAVE SIGNAL AND AN OPTICAL SIGNAL

(71) Applicant: QphoX B.V., Delft (NL)

(72) Inventors: Simon Groeblacher, Delft (NL); Moritz Forsch, Delft (NL); Robert Hugh James Stockill, Delft (NL)

(73) Assignee: QPHOX B.V., Delft (NL)

( * ) Notice: Subject to any disclaimer, the term of this patent is extended or adjusted under 35 U.S.C. 154(b) by 0 days.

(21) Appl. No.: 18/675,022

(22) Filed: May 27, 2024

(65) Prior Publication Data

US 2025/0076730 A1 Mar. 6, 2025

Related U.S. Application Data

(63) Continuation of application No. 17/314,224, filed on May 7, 2021, now Pat. No. 11,994,786, which is a continuation of application No. PCT/NL2019/050721, filed on Nov. 4, 2019.

(30) Foreign Application Priority Data

Nov. 7, 2018 (NL) .................................... 2021950

(51) Int. Cl.
 *G02F 2/02* (2006.01)
 *G06N 10/40* (2022.01)
(52) U.S. Cl.
 CPC ............... *G02F 2/02* (2013.01); *G06N 10/40* (2022.01)

(58) Field of Classification Search
 CPC .................................. G02F 2/02; G06N 10/40
 See application file for complete search history.

(56) References Cited

U.S. PATENT DOCUMENTS

| | | | |
|---|---|---|---|
| 8,600,200 B1 * | 12/2013 | Rakich | G02F 1/0126 385/7 |
| 9,296,609 B2 | 3/2016 | Park | |
| 9,928,827 B1 | 3/2018 | El-Kady et al. | |
| 10,333,044 B2 | 6/2019 | Hussein | |
| 10,578,891 B1 | 3/2020 | Schmeing et al. | |
| 10,707,812 B2 | 7/2020 | Abdo | |
| 10,858,239 B2 | 12/2020 | Painter et al. | |
| 10,944,362 B2 | 3/2021 | Abdo | |
| 11,017,310 B2 | 5/2021 | Chu et al. | |
| 11,032,011 B2 | 6/2021 | Deymier et al. | |
| 2003/0196477 A1 | 10/2003 | Auner et al. | |
| 2003/0219052 A1 | 11/2003 | Goodhue et al. | |
| 2012/0097204 A1 | 4/2012 | Yu et al. | |

(Continued)

OTHER PUBLICATIONS

Andrews, et al., "Bidirectional and efficient convension between microwave and optical light", Nature Physics, vol. 10, No. 4, pp. 321-326 (Apr. 1, 2014) XP055600106.

(Continued)

*Primary Examiner* — Collin X Beatty
(74) *Attorney, Agent, or Firm* — Saul Ewing LLP

(57) ABSTRACT

The present invention is in the field of a quantum wavelength converter between a microwave signal and an optical signal and vice versa. In the converter a nanoscale cavity optomechanical circuit is used in which optomechanical cavities supporting colocalized infrared photons and microwave phonons are combined with a photonic and a phononic waveguide.

36 Claims, 2 Drawing Sheets

(56) References Cited

U.S. PATENT DOCUMENTS

| | | |
|---|---|---|
| 2014/0326902 A1 | 11/2014 | Tahan et al. |
| 2015/0060650 A1 | 3/2015 | Park |
| 2015/0060756 A1 | 3/2015 | Park |
| 2016/0125309 A1 | 5/2016 | Naaman et al. |
| 2019/0270635 A1 | 9/2019 | Painter et al. |
| 2019/0386632 A1 | 12/2019 | Markmann et al. |
| 2020/0030849 A1 | 1/2020 | Rakich et al. |
| 2020/0050030 A1 | 2/2020 | Kittlaus et al. |

OTHER PUBLICATIONS

Balram, Krishna C., et al., "Coherent coupling between radiofrequency, optical and acoustic waves in piezo-optomechanical circuits", Nature Photonics, vol. 10, No. 5, pp. 346-352 (Mar. 28, 2016) XP055599788.

Deleglise, Samuel, et al., Hybrid optomechanical systems as transducers for quantum information; Quantum information and Measurement (QIM) (2017).

Eichenfield, Matt, et al., Optomechanical Crystals, Nature, vol. 462, pp. 78-82 (2009).

Forsch, et al., "Microwave-to-optics conversion using a mechanical oscillator in its quantum ground state," Nature Physics, vol. 16, pp. 69-74 (Jan. 2020).

Guha, Biswarup, et al., "Surface-enhanced gallium arsenide photonic resonator with quality factor of 6?x?10u6", Optica, vol. 4, No. 2, p. 218 (Feb. 20, 2017) XP55600175.

Han, Xu, et al., "Multiimode Srong Coupling in Superconducting Cavity Piezo-electromechanics", Arxiv. Or., Cornell University Library, 201 Olin Library Cornell University Ithaca, NY 14853 (Apr. 20, 2016) XP080696835.

Higginbotham, et al., "Harnessing electro-optic correlations in an efficient mechanical converter", Nature Physics, vol. 14, No. 10, pp. 1038-1042 (Jul. 16, 2018) XP055599903.

Midolo, Leonardo, et al., Nano-opto-electro-mechanical systems. Nature Nanotechnology | vol. 13 | Jan. 2018 | 11-18.

Miller, James, et al., "What is Effective Quality Factor?" Solid-State Sensors, Actuators and Microsystems Workshop Hilton Head Island, SC Jun. 3-7, 2018.

O'Connell, A.D., et al., Quantum ground state and single-phonon control of a mechanical resonator. Nature vol. 464| Apr. 1, 2010| doi:10.1038/nature08967.

Patil, et al., Thermomechanical Two-Mode Squeezing in an Ultra-high-Q Membrane Resonator, Phys. Rev. Let. 115, 017202 (2015).

Safavi-Naeini, Amir, et al., . Proposal for an optomechanical traveling wave phonon-photon translator. 2011 New J. Phys. 13 013017.

Vainsencher, et al., "Using mechanics to convert between microwave and optical frequencies," Laser Resonators, Microresonators, and Beam Controll XVIII, Proc. of SPIE, vol. 9727, 97270 (2016).

Vainsencher, Amit, et al., Bi-directional conversion between microwave and optical frequencies in a piezoelectric optomechanical device. Applied Physics Letters 109, 033107 (2016).

\* cited by examiner

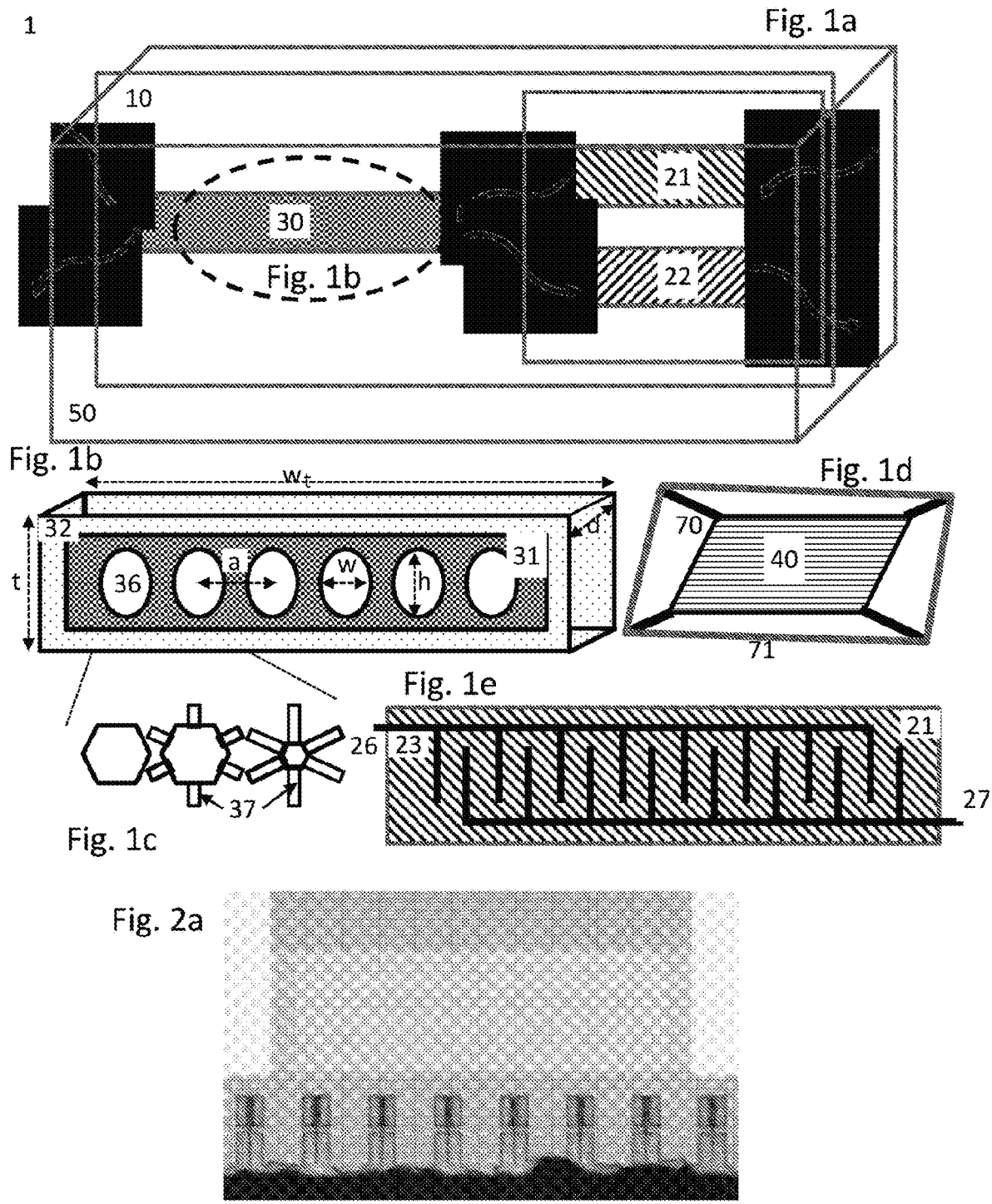

QUANTUM WAVELENGTH CONVERTER BETWEEN A MICROWAVE SIGNAL AND AN OPTICAL SIGNAL

CROSS-REFERENCE TO RELATED APPLICATIONS

This application is a continuation of U.S. application Ser. No. 17/314,224, filed on May 7, 2021, which is a continuation of International Application No. PCT/NL2019/050721, filed on Nov. 4, 2019, which claims priority to Netherlands Application No. NL 2021950, filed Nov. 7, 2018, the entire contents of each of which being fully incorporated herein by reference.

FIELD OF THE INVENTION

The present invention is in the field of a quantum wavelength converter between a microwave signal and an optical signal and vice versa. In the converter a nanoscale cavity optomechanical circuit is used in which optomechanical cavities supporting colocalized infrared photons and microwave phonons are combined with a photonic and a phononic waveguide.

BACKGROUND OF THE INVENTION

The present invention is in the field of a quantum wavelength converter between a microwave signal and an optical signal and vice versa.

The microwave signal relates to a form of electromagnetic radiation. Microwaves have wavelengths from about one meter to one millimetre and thus with frequencies between 300 MHz and 300 GHz. Microwaves are often used for communication. However it is limited to a distance of about 64 km. For the high end of the band practical communication distances are however at most about one kilometer. Microwaves are widely used in modern technology and products, such as microwave ovens.

Infrared radiation (IR) is electromagnetic radiation with longer wavelengths than those of visible light. Typical IR wavelengths are from about 700 nanometers to 1 millimeter. IR behaves both like a wave and like a quantum particle, the photon.

A resonator provides resonance at some and specific frequencies, called its resonant frequencies. Oscillations in a resonator can be either electromagnetic or mechanical, hence may relate to photons and phonons. Resonators may be used to either generate waves of specific frequencies or to select specific frequencies from a signal. An example is a quartz crystal that produces oscillations of very precise and specific frequency. A cavity resonator is one in which oscillations exist in a hollow space inside the device.

Piezo-electricity relates to an electric charge that results in a solid material, typically a crystal, in response to applied mechanical stress or force. The piezoelectric effect is considered to result from electromechanical interaction between mechanical and electrical states. In crystalline materials no inversion symmetry may be present. Piezoelectricity is a reversible process. An exemplary material is a lead zirconate titanate crystal. The piezoelectric effect may be used to produce ultrasound and is applied in various applications and products.

Recently it has been attempted to realize a microwave to optics converter either by directly coupling fields thereof inside a non-linear crystal or by using a mechanical system as a transducer. Therein bi-directional operation, coherent coupling, and efficient conversion have been achieved. However, such conversion has only been achieved at a classical level. Therein input states are submerged in thermal noise from the mechanical oscillators. This added noise renders any converted qubit state useless for further quantum processing. In order to operate a fully functional quantum transducer that could be used to link several superconducting qubit based quantum nodes over long distances, it is crucial to minimize the thermal noise that is added in such a conversion process.

Some publications recite coupling between radiofrequency, optical and acoustic waves. For instance Balram et al. in Nature Phonics, vol. 10, No. 5, Mar. 18, 2016, p. 346-352 recites coupling propagating and localized phononic modes. Andrews et al. in Nature Physics, Vol. 10, No. 4, Apr. 1, 2014, p. 321-326 recites conversion between microwave and optical light.

The present invention therefore relates to an improved quantum wavelength converter between a microwave signal and an optical signal, which solve one or more of the above problems and drawbacks of the prior art, providing reliable results, without jeopardizing functionality and advantages.

SUMMARY OF THE INVENTION

It is an object of the invention to overcome one or more limitations of the devices of the prior art and at the very least to provide an alternative thereto. The invention is also subject of a to be published scientific paper entitled "Quantum noise limited microwave to optics conversion" by amongst others Forsch, Stockill and Gröblacher, which publication and its contents are incorporated by reference thereto. The present converter is operational on a real quantum level, i.e. below a classical noise level. A microwave quantum signal can be converted into an optical quantum signal, and vice versa. For providing or receiving an optical signal at least one of an optical input 91 and an optical output 92 is provided, and likewise for providing or receiving a microwave signal at least one of a microwave input 93 and a microwave output 94 is provided. Further at least one microwave-to-optical coupler 10 is provided, wherein the coupler comprises at least one of a phonon generator 21 and a phonon detector 22 for generating a photon that is being provided to a resonator or that is received and detected therefrom, and hence mechanically coupled to the phonon generator/detector at least one of an optical high-efficiency photon generator and an optical photon detector 30 is provided, the photon generator/detector comprising at least one optomechanical resonator 31, wherein the optomechanical resonator is adapted to receive a phonon from the phonon generator or to generate a phonon to the phonon detector. The coupling between phonon generator/detector and optomechanical resonator is preferably coherent coupling and in particular quantum coherent coupling. In order to function at a quantum level the present converter 1 is provided with a cooler 50 for cooling the microwave-to-optical coupler to a temperature below 5K, and wherein the optomechanical resonator 31 comprises on a surface thereof at least one light absorption inhibiting layer 32. It has been found experimentally that both the cooler and light absorption inhibiting layer are considered necessary for operation of the present device at a true quantum level, i.e. such that quantum information can be distinguished (e.g. from background noise).

The present coupler is for physical interaction between phonon and photon, to provide conversion of the one into the other, and to provide input/output. A photon may be received, and a phonon can be released, or the reverse, or both. Depending on an application a suitable combination of inputs and outputs can be made.

In the present quantum wavelength converter the optical input 91 and optical output 92 may be independently selected from optical waveguides, such as glass fibers. Therewith a highly efficient optical input 91 and a highly efficient optical output 92 are provided. The optical waveguide may preferably be tapered, widening from the input onwards, and may preferably be of high-efficiency nature, for example through an adiabatic mode conversion of a received optical signal, typically through an input fiber, and the waveguide, and/or adiabatic mode conversion between a waveguide and an output optical signal. The refractive indices of the input (and likewise output) fiber and the waveguide may each be adiabatically adjusted through tapering (going from wide to thin and vice-versa), such that the refractive indices cross and the optical mode gets transferred between the two. Therewith a highly-efficient method of coupling light onto the chip, such as an adiabatic transfer of the optical mode of an optical input fiber (and likewise output fiber), to (and from) an on-chip waveguide.

In a second aspect the present invention relates to a quantum network or quantum computing nodes comprising at least one present quantum wavelength converter.

The present invention is made possible by funds of the European Research Council (ERC StG Strong-Q, grant 676842) and Netherlands Organisation for Scientific Research (NWO/OCW) Vidi grant (680-47-541/994).

The present invention provides a solution to one or more of the above mentioned problems and overcomes drawbacks of the prior art.

Advantages of the present description are detailed throughout the description.

In an exemplary embodiment of the present quantum wavelength converter the optical signal may have a wavelength of 400 nm-1 mm, preferably 800 nm-15000 nm, more preferably 1000 nm-3000 nm, even more preferably 1200 nm-2000 nm, such as 1400-1700 nm. The wavelengths are particularly suited for transferring signals over long distances, e.g. 10-1000 kms.

In an exemplary embodiment of the present quantum wavelength converter a microwave may have a frequency in the range of 0.3-300 GHz, preferably 1-100 GHz, more preferably 1.4-20 GHz, such as 2-10 GHz. These frequencies are often used for transfer of information over relative short distances, e.g. less than 10 km, and typically within a few 100 meters.

In an exemplary embodiment of the present quantum wavelength converter the optical input may provide 10 nW-1 µW power to the converter, preferably 20-500 nW, such as 30-300 nW. Without a light absorption inhibiting layer, in combination with these powers applied, a quantum ground state energy, or an energy close thereto (see below) could not be reached experimentally.

In an exemplary embodiment of the present quantum wavelength converter a lensed fibre with a focal length may be used, the focal length being adapted for the wavelength of light used, such as a focal length of 14 µm.

In an exemplary embodiment of the present quantum wavelength converter the microwave input 93 and microwave output 94 may be independently selected from photon waveguides, such as a crystal waveguides, and a coaxial cable. The microwave input may be attenuated, such as by several dB. The coaxial cable is preferably superconducting at operating temperature, such as an Al cable.

In an exemplary embodiment of the present quantum wavelength converter the phonon waveguides may be provided with a phononic shield at a side, or sides, of the waveguide. The shield functions as an acoustic insulator.

In an exemplary embodiment of the present quantum wavelength converter the coupler 10 may be within 1000% of a quantum ground state energy, preferably within 100%, more preferably within 50%, such as within 15%. Albeit the upper range of 1000% may seem high, it is found sufficiently low for many applications; important is that a quantum can still be distinguished as such. It is noted that an energy is preferably as low as possible. Inventors have achieved "close to ground state" levels, such as within (+) 50% thereof, and even within 15% thereof. It is noted that with a typically applied light power GaAs is found unsuited, as experimentally the coupler then is around or above the 1000% above quantum ground state energy (300% at the best).

In an exemplary embodiment of the present quantum wavelength converter the coupler 10 may be adapted to generate at least one excitation or at least one photon or at least one (further) quantum state, respectively.

In an exemplary embodiment of the present quantum wavelength converter the phonon generator/detector 21,22 may comprise at least one of interdigitated electrically conducting contacts 23. These contacts provide good and reliable generation/detection of single phonons, such as by activating a piezoelectric layer.

In an exemplary embodiment of the present quantum wavelength converter the phonon generator/detector 21,22 may comprise a superconducting quantum bit, and the coupler 10 may comprise an external voltage connection 26,27 in electrical contact with the generator/detector and/or quantum bit. A voltage may typically be provided in order to control the present device and operate said device, or parts thereof.

In an exemplary embodiment of the present quantum wavelength converter the phonon generator 21 and phonon detector 22 may be at least one piezoelectric layer, such as a crystallographic piezoelectric layer. With such as layer good and reliable generation/detection of single phonons is achieved.

In an exemplary embodiment of the present quantum wavelength converter the piezoelectric layer may be combined with a light absorption inhibiting layer or may be selected from light absorption inhibiting layers (i.e. may be applied as such, without a further light absorption inhibiting layer, as the layer already functions as such), such as III/V materials, wherein "III" materials are selected from B, Al, Ga, In, and Tl, and wherein "V" materials are selected from N, P, As, and Sb, such as GaN, GaP, AlN, and AlP, with the proviso that GaAs is excluded, and niobates, tantalates, and vanadates, such as monovalent salts thereof, such as Li comprising salts thereof, such as $LiNbO_3$, $LiTaO_3$. As such the light absorption inhibiting layer and at least one piezoelectric layer may be combined.

In an exemplary embodiment of the present quantum wavelength converter the optical resonator 30 may preferably be a planar resonator, such as a crystal resonator, and may comprise at least one hole 36, each hole having a major axis height (h) and minor axis width (w), wherein a height is from 0.1-2.0 µm, and a width is from 0.1-2.0 µm, and wherein holes have a spacing (a) (heart to heart) of 0.3-2.0 µm, said spacing preferably being constant over the resonator. Such an optical resonator can be mechanically coupled to the present phonon generator/detector and operate at a single photon level.

In an exemplary embodiment of the present quantum wavelength converter the optical resonator 30 may comprise 10-2000 holes 36, wherein holes are aligned in an array of 1*10 to 20*100.

In an exemplary embodiment of the present quantum wavelength converter a shape of the holes 36 may be selected from ellipsoid, circular, multigonal, such as hexagonal, multigonal with a protrusion 37 at a side thereof, such as hexagonal with a protrusion.

In an exemplary embodiment of the present quantum wavelength converter each optical resonator 30 individually may have a thickness (t) of 150 nm-1 mm, preferably 200 nm-10000 nm, even more preferably 250 nm-1000 nm, a total width (wt) of 1-10000 μm, preferably 5-1000 μm, more preferably 10-500 μm, such as 20-300 μm, and a total depth (d) of 1-10000 μm, preferably 5-1000 μm, more preferably 10-500 μm, such as 20-300 μm.

In an exemplary embodiment of the present quantum wavelength converter a material of the optical resonator may be selected from III/V materials, such as GaAs, and $LiNbO_3$, and $LiTaO_3$, dielectric material, such as silicon oxide, such as quartz, silicon nitride, and silicon carbide, and silicon.

In an exemplary embodiment of the present quantum wavelength converter the light absorption inhibiting layer 32 may be selected from a dielectric material, wherein a cation of the dielectric material is selected from Al, Ti, Ta, and Si, and wherein the anion of the dielectric material is selected from O, N, and C, and combinations thereof.

In an exemplary embodiment of the present quantum wavelength converter the light absorption inhibiting layer 32 may be a conformal layer, that is conforms to the contours of an underlying structure, i.e. the present optical resonator. The layer therefore has approximately a same thickness over the full layer.

In an exemplary embodiment of the present quantum wavelength converter the light absorption inhibiting layer may have a thickness of 1-10 nm, preferably 2-8 nm, such as 4-6 nm. It is found that a relatively thin layer is sufficient to inhibit light absorption completely or almost completely.

In an exemplary embodiment of the present quantum wavelength converter the light absorption inhibiting layer 32 may be at least one of an ALD layer, and a chemically oxidized layer. These techniques are found very suited for providing such layers. Also more than one layer may be provided, each layer having a thickness of a fraction of the thickness of the total layer. In addition the (chemical) composition of the layers may be varied.

In an exemplary embodiment of the present quantum wavelength converter the light absorption inhibiting layer 32 may absorb less than 1 ppm of (the optical signal) photons provided thereon, such as less than 5 ppb. Such a level is sufficiently low as not to interfere with photon and phonon generation on a single level thereof.

In an exemplary embodiment of the present quantum wavelength converter the cooler 50 may be adapted to cool the microwave-to-optical coupler 10 to a temperature below 1K, preferably below 300 mK, more preferably below 100 mK, even more preferably below 25 mK, such as below 15 mK. It has been found that lower temperatures provide even better quantum behaviour of the present system.

In an exemplary embodiment of the present quantum wavelength converter the at least one microwave-to-optical coupler 10 may be integrated within one membrane 40. In view of fabrication thereof and in view of operation such is preferred. It is noted however that in an alternative exemplary embodiment a part or all of the at least one microwave-to-optical coupler 10 may in fact not be suspended and may be integrated otherwise, such as in a chip.

In an exemplary embodiment of the present quantum wavelength converter the membrane 40 may be tethered 70 at corner sections thereof to a frame 71. Tethers and a frame are found to reduce unwanted interference, such as vibrations.

In an exemplary embodiment the present quantum wavelength converter may comprise at least one of an optical input 91 and at least one microwave output 94, or may comprise at least one optical output 92 and at least one microwave input 93, or may comprise at least one optical input 91 and at least one an optical output 92 and at least one microwave input 93 and at least one microwave output 94. So various configurations are available, e.g. depending on an intended use of the present converter.

In an exemplary embodiment the present quantum wavelength converter may comprise independently at least one phonon generator 21 and at least one phonon detector 22. Phonon detection and phonon generation may be provided as separate entities, which may be advantageous in certain applications.

In an exemplary embodiment the present quantum wavelength converter may be adapted to operate in pulsed mode.

The invention will hereafter be further elucidated through the following examples which are exemplary and explanatory of nature and are not intended to be considered limiting of the invention. To the person skilled in the art it may be clear that many variants, being obvious or not, may be conceivable falling within the scope of protection, defined by the present claims.

BRIEF DESCRIPTION OF THE DRAWINGS

FIGS. 1a-e show schematically details of the present device.

Figure 2B:
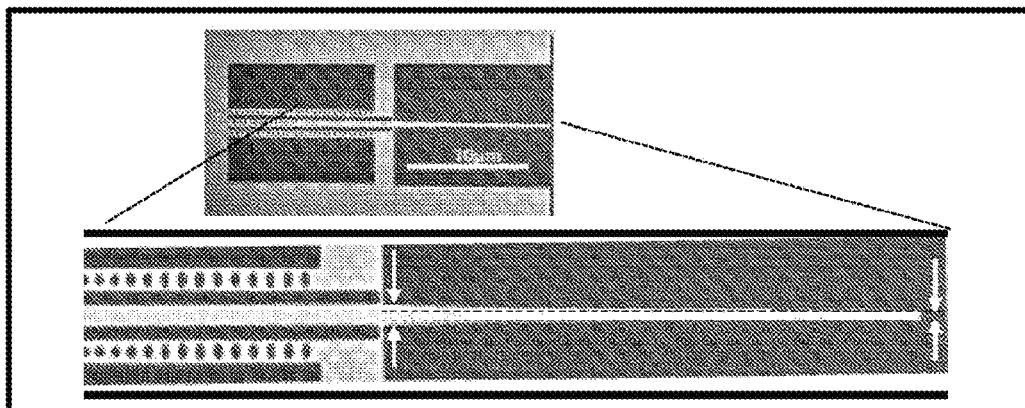
FIGS. 2 a-e show an example and results obtained.

In the figures:
a heart to heart spacing holes 36-36
d depth of optical resonator
h height of a hole 36
t thickness optical resonator
w width of a hole 36
$w_t$ width of optical resonator
1 quantum wavelength converter
10 microwave-to-optical coupler
21 phonon generator
22 phonon detector
23 interdigitated electrically conducting contacts
26 external voltage connection
27 external voltage connection
30 optical photon generator and/or optical photon detector
31 optomechanical resonator
32 light absorption inhibiting layer
36 hole
37 protrusion
40 membrane
50 cooler
70 tether
71 frame
91 optical input
92 optical output
93 microwave input
94 microwave output

DETAILED DESCRIPTION OF THE INVENTION

FIG. 1a shows a schematically set-up of the present device 1. Optical and microwave inputs 91,93 and outputs

Figure 2C:
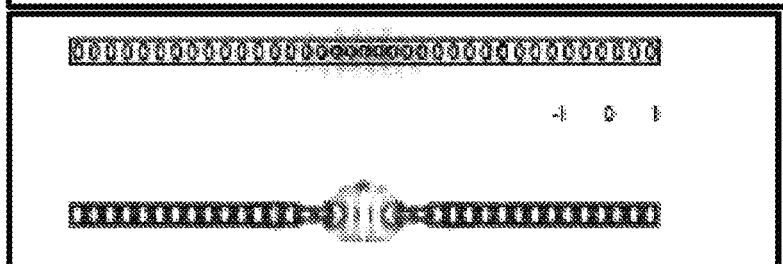
Figure 2D:
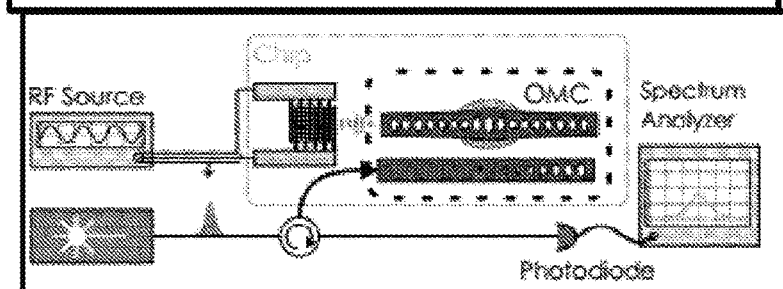
Figure 2E:
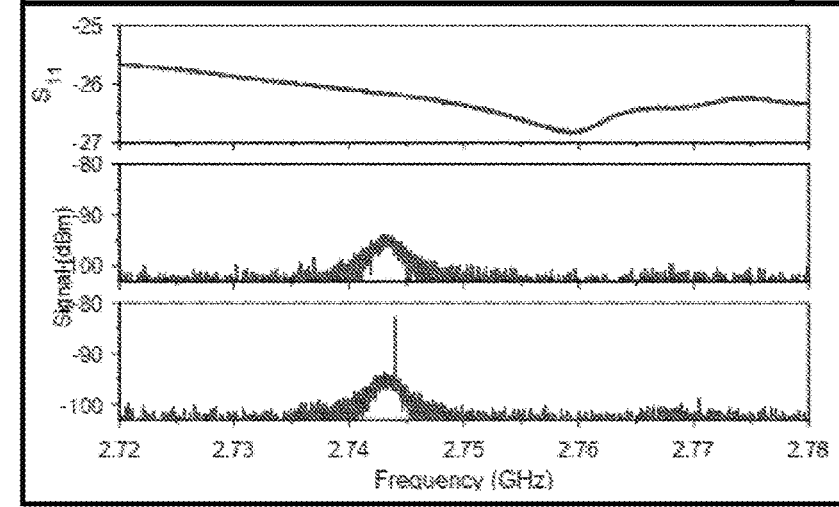

92,94 are shown. At a right side a phonon generator 21 and phonon detector 21 and 22, such as for instance shown in FIG. 2 are shown. A phone is provided to or received from optical photon generator and/or optical photon detector 30. The phonon and photon generator may together be referred to as microwave-to-optical coupler. These may all be provided as one single structure, such as on a membrane 40. The whole system is cooled to very low temperatures, typically well below 5K, and operated as such temperatures. FIG. 1*b* shows the optical photon generator and/or optical photon detector 30, comprising an optomechanical resonator 31, and provided with a light absorption inhibiting layer 32 covering most or all of the resonator and detector. The generator/detector 30 has a thickness t, w depth d, and a total width $w_t$. The holes 36 have a width w, a height h, and a spacing (heart to heart) of a, which is constant in the example. FIG. 1*c* shows various cross-section of holes 36. The second and third example show protrusions 37, thereby providing the third example a snow-flake like form. FIG. 1*d* shows that the membrane 40 can be attached by tethers 70 to a frame 71. FIG. 1*e* shows interdigitated electrically conducting contacts 23 on phonon generator 21, provided with external voltage connections 26 and 27. FIG. 2 shows a device layout and room temperature characterization thereof. FIG. 2*a* shows a microscope image of the transducer device structure. The structures comprise an interdigital transducer (IDT). The IDT spans several optomechanical devices for ease of fabrication. The bottom side of the chip is directly accessible with a lensed fiber, allowing for optical access to the device. FIG. 2*b* shows a scanning electron microscope image of a pair of optomechanical devices. A central waveguide is used for evanescently coupling light in and out of the devices using the lensed fiber (which is accessed from the right here). FIG. 2*b* is further provided with an enlargement section, identifying the tapered parts. On a left side the width of the optical wave guide (see arrows) is larger than the width thereof on the right side, indicative of tapering. FIG. 2*c* shows finite element simulations of the optomechanical device. FIG. 2*d* shows schematic of a room temperature characterization setup. A laser is used to optically address the device, which is then measured on a high-speed photodiode to resolve the noise spectrum around the mechanical mode of the device, while an RF source is used to drive the IDT. FIG. 2*e* shows a S11 reflection measurement of the IDT device with a resonance at 2.76 GHz (top). The mechanical noise power spectral density is plotted with (bottom) and without (center) the RF drive tone applied to the IDT, which results in a narrow, coherent peak in the spectrum on top of the thermal peak. The laser in these measurements is blue-detuned from cavity resonance by one mechanical frequency $\bar{\omega}_m$.

EXAMPLES

In an example inventors provide a microwave to optics transducer that operates at the quantum limit. A piezoelectric optomechanical crystal is cooled to its quantum ground state. It is coupled to a microwave circuit through surface acoustic waves. A weak-coherent microwave pulse is converted first into a mechanical mode and then into a photon mode at microwave (telecom) wavelength. Less than a single phonon is used on average. The present device operates at the quantum limit. Classical noise is limited. The device consists of a 1D optomechanical crystal (OMC), shown in FIG. 2(*b*), which is mechanically coupled to an interdigital transducer (IDT) through surface acoustic waves. A device comprises a 250 nm thick GaAs layer. A large refractive index and good piezoelectric properties are provided. FIG. 2*c* shows finite element simulations of the device. The IDT is capable of exciting surface acoustic waves (SAWs) in the GaAs device layer and is designed to operate at the same frequency as the mechanical mode in order to efficiently transfer energy into the mechanical mode. The SAWs are provided close to the surface, such as about 500 nm from the surface. The device comprises 5 nm of $AlO_x$ that reduces unwanted drive-laser absorption. Before deposition inventors stripped native oxide off the GaAs using 7:1 BOE. Then the 5 nm deposition of ALD $AlO_x$ at 300° C. was performed. A reduction in the initial thermal occupation of the mechanical resonator was obtained. A device with a microwave resonance centered at 2.76 GHz is obtained.

Conversion from microwave to optical telecom signals at mK temperatures is measured. Red-detuned anti-Stokes optical pulses are sent into the OMC to convert the state of the mechanical mode into photons. The frequency of the RF drive tone is swept across the mechanical resonance. The results show a reliable conversion of a coherent microwave to a coherent optical signal, with only a fixed thermal contribution of the ground-state occupation of the mechanical resonator. Furthermore, these measurements show an ability to detect displacement amplitude of the initial state in the mechanical resonator down to a single phonon. Even at lowest power the conversion of the coherent microwave component is confirmed. The conversion of a coherent GHz microwave to an optical telecom signal at the single quantum level is demonstrated using the present device.

The invention claimed is:

1. A quantum transduction system configured to transfer individual quantum states, the system including a cryogenically cooled, resonant electro-mechanical interface coupling device configured to operate such that quantum information can be distinguished from background noise;
   in which the system includes a drive laser converting between a mechanical mode and a photon mode whilst preserving quantum coherence, and in which the drive laser is a detuned laser configured to result in cavity enhanced scattering.

2. The quantum transduction system of claim 1 in which the drive laser is a red-detuned laser configured to result in anti-Stokes scattering.

3. The quantum transduction system of claim 2 in which photons from the red de-tuned laser are de-tuned from a cavity resonance frequency of the resonant electro-mechanical interface coupling device and undergo cavity-enhanced anti-Stokes scattering, resulting in the photon mode output being at the cavity resonance frequency.

4. The quantum transduction system of claim 1 in configured to operate at a quantum level, such that quantum information can be distinguished from background noise.

5. The quantum transduction system of claim 1 in which the resonant electro-mechanical interface coupling device is configured to be resonant with incoming microwave photons.

6. The quantum transduction system of claim 1 in which the resonant electro-mechanical interface coupling device is a piezoelectric coupling device that is configured to be resonant with incoming microwave photons.

7. The quantum transduction system of claim 6 in which the piezoelectric coupling device includes a 1D piezoelectric optomechanical crystal (OMC).

8. The quantum transduction system of claim 7 in which the 1D piezoelectric optomechanical crystal (OMC) is mechanically coupled to an interdigital transducer (IDT).

9. The quantum transduction system of claim 6 in which the piezoelectric coupling device is a piezoelectric optomechanical crystal with a gigahertz frequency mechanical mode.

10. The quantum transduction system of claim 6 in which the piezoelectric coupling device is configured to be cooled to its quantum ground state and to remain in the ground state during conversion of a microwave quantum state to an optical quantum state.

11. The quantum transduction system of claim 6 in which the piezoelectric coupling device is configured to generate a single phonon from a single input photon.

12. The quantum transduction system of claim 1 in which the resonant electro-mechanical interface coupling device has a gigahertz frequency mechanical mode.

13. The quantum transduction system of claim 12 in which the resonant electro-mechanical interface coupling device has a gigahertz frequency mechanical mode centered at 2.7 GHz.

14. The quantum transduction system of claim 1 in which the resonant electro-mechanical interface coupling device is configured to receive an input quantum state in the microwave domain, and to generate a phonon state that encodes the input quantum state information and, through a quantum coherent state conversion process, couples that quantum state information to an optical quantum state which it then outputs at an optical (UV, VIS, or IR) wavelength.

15. The quantum transduction system of claim 14 in which the optical quantum state that is created from the phonon state through the conversion process is evanescently coupled to an optical waveguide that is then coupled to an optical fiber.

16. The quantum transduction system of claim 1 in which the resonant electro-mechanical interface coupling device is configured to generate on average a single phonon for each incoming photon.

17. The quantum transduction system of claim 1 in which the resonant electro-mechanical interface coupling device is configured to operate at a single phonon level.

18. The quantum transduction system of claim 1 in which the resonant electro-mechanical interface coupling device is configured to receive an optical quantum state that encodes quantum information, and through a coherent state conversion process, to couple that quantum state information to a phonon state that encodes the quantum state information and convert that phonon state to a microwave signal that encodes the quantum state information.

19. The quantum transduction system of claim 18 in which the optical quantum state is evanescently coupled to an optical waveguide.

20. The quantum transduction system of claim 1 in which the resonant electro-mechanical interface coupling device comprises a resonant electro-mechanical interface that is coupled to an opto-mechanical resonance interface.

21. The quantum transduction system of claim 20 in which the resonant electro-mechanical interface is configured to generate a phonon state that encodes input quantum state information and, through a quantum coherent state conversion process, the opto-mechanical resonance interface is configured to couple that quantum state information to an optical quantum state.

22. The quantum transduction system of claim 20 in which the material of the opto-mechanical resonance interface is selected from III/V materials, such as GaAs, and LiNbO3, and LiTaO3, a dielectric material, such as silicon oxide, such as quartz, silicon nitride, and silicon carbide, and silicon.

23. The quantum transduction system of claim 20 in which the opto-mechanical resonance interface includes a periodic structure shaped and sized to generate optical resonance.

24. The quantum transduction system of claim 1 in which the resonant electro-mechanical interface coupling device is a heterogenous structure integrated into a chip and comprises an electro-mechanical resonator that is mechanically coupled to an opto-mechanical resonator, and different materials are used for the electro-mechanical resonator and for the optical opto-mechanical resonator.

25. The quantum transduction system of claim 1 in which the resonant electro-mechanical interface coupling device is a homogenous structure integrated into a chip and comprises an electro-mechanical resonator that is mechanically coupled to an opto-mechanical resonator, and the same material is used for the electro-mechanical resonator and for the opto-mechanical resonator.

26. The quantum transduction system of claim 1 in which the resonant electro-mechanical interface coupling device includes a photon absorption surface layer to inhibit absorption of photons that would otherwise heat the mechanical resonance coupling device and hence add unwanted noise.

27. The quantum transduction system of claim 26 in which the resonant electro-mechanical interface coupling device operates at optical (UV, VIS, or IR) wavelengths and the photon absorption layer does not absorb light in those wavelengths.

28. The quantum transduction system of claim 26 in which the photon absorption surface layer is selected from a dielectric material, wherein a cation of the dielectric material is selected from Al, Ti, Ta, and Si, and wherein the anion of the dielectric material is selected from O, N, and C, and combinations thereof.

29. The quantum transduction system of claim 26 in which the photon absorption layer is a conformal layer, and the light absorption inhibiting layer has a thickness of 1-10 nm, preferably 2-8 nm, such as 4-6 nm.

30. The quantum transduction system of claim 26 in which the photon absorption layer is at least one of an ALD layer, and a chemically oxidized layer.

31. The quantum transduction system of claim 1 in which the resonant electro-mechanical interface coupling device includes materials selected from the following materials: III/V materials, wherein "III" materials are selected from B, Al, Ga, In, and Tl, and wherein "V" materials are selected from N, P, As, and Sb, such as GaN, GaP, AlN, and AlP, and niobates, tantalates, and vanadates, such as monovalent salts thereof, such as Li comprising salts thereof, such as LiNbO3, and LiTaO3.

32. The quantum transduction system of claim 1 in which the resonant electro-mechanical interface coupling device is at least in part integrated onto a single chip.

33. The quantum transduction system of claim 1 in which the resonant electro-mechanical interface is configured to generate surface acoustic waves.

34. The quantum transduction system of claim 1 in which the system includes a cryostat or cooler that encloses the resonant electro-mechanical interface coupling device, and the cryostat or cooler is configured to cryogenically cool the electro-mechanical device to an operational state selected from the following: less than 5K; less than 1K; less than 300 mK; less than 100 mK; less than 25 mK; less than 15 mK; less than 1000% of the applicable quantum ground state energy; less than 100% of the applicable quantum ground state energy; less than 50% of the applicable quantum ground state energy; less than 15% of the applicable quantum ground state energy; close to the quantum limit.

35. The quantum transduction system of claim 1 in which the system outputs a signal at an optical telecom low-loss wavelength and is configured to couple to one or more of the following: an optical fiber; a quantum processor operating in the microwave domain with a network operating in the optical (UV, VIS, IR) domain; a network of quantum processors, each operating in the microwave domain, using a fiber optic network operating in the optical domain; a distributed quantum computing network.

36. A quantum transduction method for transferring individual quantum states, using a cryogenically cooled, resonant electro-mechanical interface coupling device configured to operate such that quantum information can be distinguished from background noise;
   the method includes the step of operating a drive laser to convert between a mechanical mode and a photon mode whilst preserving quantum coherence, and in which the drive laser is a detuned laser configured to result in cavity enhanced scattering.

\* \* \* \* \*